United States Patent

[11] 3,622,200

| [72] | Inventor | Martin J. Bird |
| | | Norwalk, Ohio |
| [21] | Appl. No. | 55,507 |
| [22] | Filed | July 16, 1970 |
| [45] | Patented | Nov. 23, 1971 |
| [73] | Assignee | Persons-Majestic Manufacturing Company |
| | | Worcester, Mass. |

[54] CYCLE SADDLE
1 Claim, 5 Drawing Figs.

[52] U.S. Cl. ............................................. 297/195,
297/214
[51] Int. Cl. ............................................. B62j 1/00
[50] Field of Search ................................... 297/195,
214; 85/37; 24/144, 9, 96, 94, 227, 31

[56] References Cited
UNITED STATES PATENTS

| 3,501,119 | 3/1970 | Rich, Jr. ............... | 297/195 X |
| 1,798,812 | 3/1931 | Rosenbeck ............ | 85/37 |
| 3,432,204 | 3/1969 | Brilando ............... | 297/214 |
| 1,976,776 | 10/1934 | Gookin ................ | 85/37 X |
| 1,970,533 | 8/1934 | Brandt ................. | 297/214 |
| 2,190,992 | 2/1940 | Mesinger .............. | 297/214 |
| 2,244,956 | 6/1941 | Miller et al. .......... | 297/214 |
| 3,258,290 | 6/1966 | Karbin ................. | 297/214 |

FOREIGN PATENTS

| 526,842 | 3/1954 | Belgium ............... | 297/195 |

*Primary Examiner*—James T. McCall
*Attorney*—Charles R. Fay

ABSTRACT: A cycle saddle comprising a baseplate and an insert, and a cover, a saddle post bracket attached to said insert by means of a pair of struck up generally cylindrical members like hollow rivets extending through commensurate apertures in the insert, said members being peened over on the interior of the insert in the areas adjacent the apertures.

PATENTED NOV 23 1971

3,622,200

INVENTOR
MARTIN J. BIRD

BY Chas. R. Fay,
ATTORNEY

CYCLE SADDLE

BACKGROUND OF THE INVENTION

The bracket for the saddle post clamp of a cycle saddle has been conventionally secured to the insert plate of a cycle saddle by spot welding. While generally satisfactory and relatively inexpensive, it sometimes happens that the welded areas are faulty, causing the same to be weakened, after extensive and hard usage of the cycle. Then the welds are apt to break causing the cycle saddle to be useless and requiring replacement. It is the object of the present invention to provide a more positive and long lasting connection between the saddle post bracket and the cycle saddle insert.

SUMMARY OF THE INVENTION

This invention provides a cycle saddle comprising a baseplate, an insert, the insert and the baseplate together fastening between them the edges of the saddle cover and generally completing the saddle except for the saddle post bracket. This saddle post bracket is a U-shaped member the legs of which accommodate a bolt for securing the usual saddle post clamp in adjustable position with respect thereto.

In order to form a permanent connection between the base of the saddle post bracket and the insert plate, two holes are punched in the base of the bracket and the material adjacent these apertures is extruded to form a pair of outstanding members similar to hollow rivets. Holes having been prepared at desired locations in the insert, the two extruded members, which match the holes, are inserted therein bearing upon the edges of the apertures in the insert. The extruded members are appreciably longer than the thickness of the insert and are then peened over to become permanently connected with respect to the edge portions of the holes previously punched in the insert.

PREFERRED EMBODIMENT OF THE INVENTION

Figure 1:
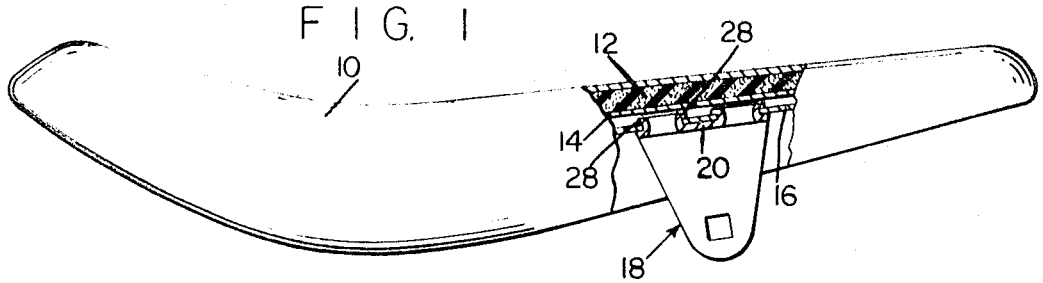
FIG. 1 is a view in side elevation of a cycle saddle, parts being broken away in section illustrating the invention.

In FIG. 1 there is shown a cycle saddle having a leather, plastic, or fabric cover 10 underlying which is usually yielding material such as foam or sponge rubber or the like 12. The baseplate is indicated at 14 and the insert plate at 16. These two plates are provided with downturned marginal edges which grip the edges of the cover 10 between them generally completing the saddle.

Figure 2:
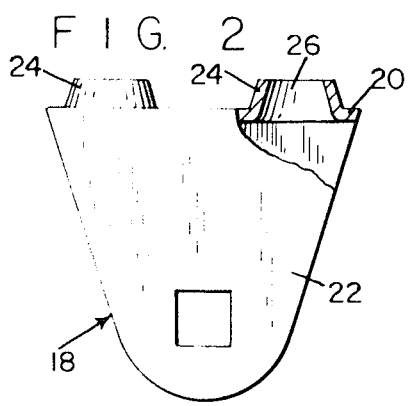
FIG. 2 is a view in side elevation, part in section, of saddle post bracket prior to assembly with the insert.
Figure 3:
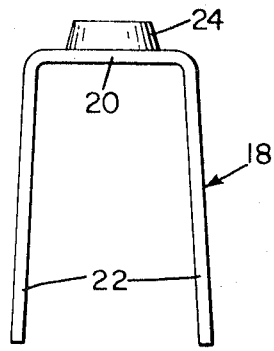
FIG. 3 is a front view thereof.

The reference numeral 18 indicates a bracket of general U-shape as seen in FIG. 3 and having a plate 20 connecting the two legs 22 of the bracket, forming the U. This holds the conventional saddle post clamp not shown. There are a pair of apertures having struck up edge portions, and these are extruded outwardly forming walls 24. These extrusions form tapering, truncated conical configurations as shown in FIGS. 2 and 3.

Figure 4:
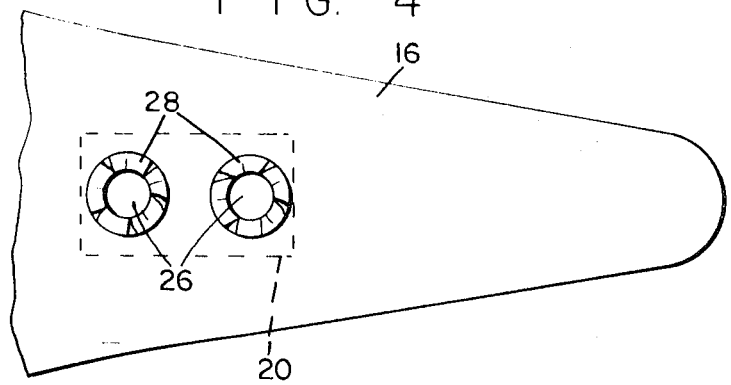
FIG. 4 is a plan view of a portion of the insert at the interior side thereof showing the connection.
Figure 5:
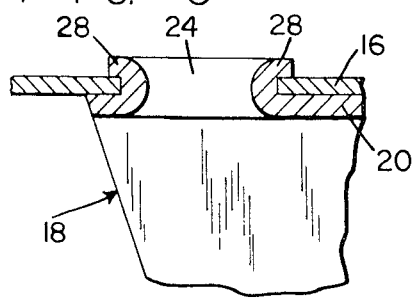
FIG. 5 is a section showing the connection on a larger scale.

The insert 16 has previously been provided with a pair of openings these being indicated at 26, see FIG. 4. To attach the bracket 18 with respect to the insert, the conical extruded formations 24 are thrust through these holes which are complementary with respect thereto and then the upstanding portions thereof are peened over as indicated at 28 in FIGS. 1 and 5.

This provides an extremely strong and permanent connection between saddle post bracket 18 and the saddle itself as by connection to the insert plate 16. The assembling operation is done with respect to the insert plate before it is assembled with the baseplate 14 to complete the saddle. Continued and very hard usage has been found not to disturb this connection so that the saddle is considerably improved over the prior art method of welding the base 20 of the bracket 18 with respect to the insert plate 16. Thus without any additional expense and even with a small saving in costs, the saddle in this respect has been improved over the prior art insofar at least as permanency is concerned.

I claim:

1. A cycle saddle comprising a cover, a baseplate, an insert plate generally coextensive with respect to the baseplate, and a space between the plates over the major portion of the areas thereof, said plates gripping between them the cover at the edges of the latter, the insert plate having a pair of spaced openings therein aligned in a fore-and-aft direction relative to the saddle, a bracket for a conventional saddle post clamp, said bracket comprising a U-shaped member including a flat base and a pair of extending arms, the latter being correspondingly apertured to mount the saddle post clamp, a pair of space hollow members on the base of the bracket extending oppositely to the arms, said hollow members being originally tapered to converge upwards, said hollow members being arranged in conformance to the openings in the insert plate and the narrowest edges thereof being less in diameter than those of the openings for quick and easy accurate application to the insert plate with the tapered members extending through the openings, said hollow members being peened over the edge portions of the openings in the insert plate and closely embracing and holding the same.

* * * * *